W. McA. JOHNSON.
PROCESS OF TREATING ZINC BEARING MATERIALS.
APPLICATION FILED JUNE 27, 1913. RENEWED DEC. 10, 1914.
1,146,075.
Patented July 13, 1915.
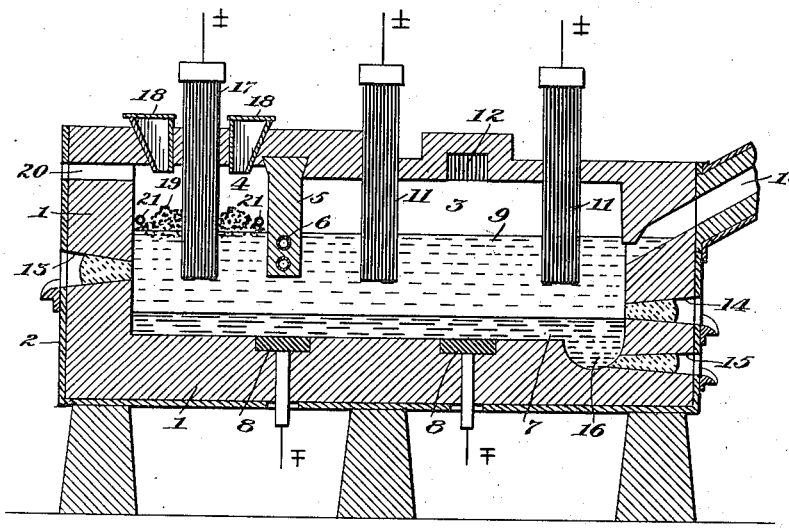
Witnesses:
N. P. Leonard.
C. H. Potter.
Inventor:
Woolsey McA. Johnson,
by Byrnes, Townsend & Buckenstein,
Att'ys.

UNITED STATES PATENT OFFICE.

WOOLSEY McA. JOHNSON, OF HARTFORD, CONNECTICUT, ASSIGNOR TO THE CONTINUOUS ZINC FURNACE COMPANY, OF HARTFORD, CONNECTICUT, A CORPORATION OF CONNECTICUT.

PROCESS OF TREATING ZINC-BEARING MATERIALS.

1,146,075. Specification of Letters Patent. Patented July 13, 1915.

Application filed June 27, 1913, Serial No. 776,185. Renewed December 10, 1914. Serial No. 876,538.

*To all whom it may concern:*

Be it known that I, WOOLSEY McA. JOHNSON, a citizen of the United States, residing at Hartford, in the county of Hartford and State of Connecticut, have invented certain new and useful Improvements in Processes of Treating Zinc-Bearing Materials, of which the following is a specification.

This invention relates to the reduction of zinc-bearing slags, or equivalent materials, in the electric furnace by the action of metallic iron.

In my prior patent 868,345, patented October 15, 1907, I have described and broadly claimed a method of reducing zinc from its ores or compounds by reacting thereon in the electric furnace with metallic iron.

One embodiment of the invention, as described in said patent, consists in roasting ferruginous blende to remove a part of the sulfur, then reducing part or all of the iron to sponge form by suitable metallurgical methods, and finally smelting the product of this reduction, containing in addition to the sponge iron and zinc oxids, sulfids of zinc, lead and copper, the precious metals, and admixed carbon, in an electric furnace. In this smelting operation, the iron reduces the residual zinc sulfid with formation of a matte which is treated for recovery of the precious metals.

The present invention relates particularly to the recovery of zinc, either as metal or in the form of blue powder or oxid, from silicate slags, such as result for instance from the smelting of lead ores in the so-called lead blast furnace, and from the reduction of certain ores containing zinc and copper. Such slags are essentially silicate compositions in which iron and calcium predominate, carrying minor proportions of aluminum, manganese and magnesium, and containing some eight per cent., more or less, of zinc oxid. According to the present invention such slags are subjected in an electric furnace to the reducing action of iron, under proper conditions to volatilize the zinc. The resulting highly-ferruginous slags, in which the zinc has been largely or completely replaced by iron, are then subjected to a reducing operation to separate at least a portion of the iron in the form of metal, and this reduced iron is returned to the electric furnace for the reduction of further portions of the zinc-bearing slag. The process is thus cyclical in character, although it may be either continuous or intermittent in operation.

For a full understanding of the invention, reference is made to the accompanying drawing, illustrating in vertical section one type of furnace for the practice of the process.

In said drawing, 1 represents the refractory structure of the furnace, externally sheathed by metal 2. Interior chambers 3 and 4 are provided, partially separated by a depending wall or partition 5, which may be of graphite or of refractory brick, preferably watercooled by pipes 6.

7 indicates a layer of molten iron covering the hearth of the furnace and contacting with lower electrodes or connectors 8, 8.

9 is a layer of molten zinc-bearing slag overlying the iron, and 10 a runway through which the slag may be introduced in fluid state from the lead blast furnace, the arrangement being such that the molten slag serves as a seal for the slag-inlet. Electrodes 11, 11 of carbon or graphite are located in the chamber 3 and depend into the slag bath 9.

12 represents a flue for the volatilized zinc and other gaseous products of the reduction, this flue leading to any suitable collecting and condensing system, not shown.

13 represents a tap for slag, 14 a tap for matte, and 15 a lead tap communicating with a sump 16.

In the chamber 4 is an electrode 17, likewise of carbon or graphite and connected as desired in the same electric circuit as the electrodes 11 in multiple therewith, or in an independent circuit.

18, 18 are hoppers through which coke or coal 19 may be discharged into the chamber 4.

20 is an outlet for gases arising from the furnace chamber 4, and 21, 21 are the twyers in this chamber.

In operation of this particular type of furnace, the iron is run into the furnace in molten state and in quantity sufficient to cover the hearth to a depth of a few inches. Fluid zinc-bearing slag is run in above the iron, and the temperature within the chamber 3 is brought up to and maintained at a point sufficient to effect reduction of the zinc, by passage of the electric current between the electrodes 11 and the metal bath 7. This reduction occurs, in accordance with the reaction $$ZnOSiO_2 + Fe = Zn + FeOSiO_2$$

or more generally $$(MO)ZnOSiO_2 + Fe = Zn + (MO)FeOSiO_2.$$

The zinc vapor passes from the furnace by flue 12 and is condensed in the usual manner, the absence of large proportions of diluting gases rendering this operation simple and efficient.

The slag, denuded of most or all of its zinc and proportionately enriched in iron, flows beneath the depending wall 5 into the furnace chamber 4, in which it is smelted in presence of carbon. In this operation a certain portion of the iron is reduced to metal, and collects in molten state in the layer 7, serving to replenish the same. It is sought so to adjust the smelting conditions in the chambers 3 and 4 that the iron which passes into the slag in the chamber 3 in replacement of the zinc and other metals there reduced will be substantially restored by the carbon reduction of the highly-ferruginous slag in the chamber 4. The residual slag is tapped continuously or intermittently at 13 to maintain the proper level of the slag bath. Any lead contained in the original slag is of course also reduced by the iron and collects beneath the same, being withdrawn through tap 15, carrying with it such gold and silver as may be present. Copper is likewise reduced, and in case sulfur is present collects as a copper-iron matte upon the surface of the molten iron, and is withdrawn through tap 14.

A typical lead blast furnace slag may present about the following composition:

| | |
|---|---|
| $FeO(MnO)$ | 36 per cent. |
| $SiO_2$ | 27 " " |
| $CaO(MgO)$ | 18 " " |
| $ZnO$ | 8 " " |
| $Al_2O_3$ | 8 " " | with small proportions of lead, copper, gold, silver, etc.

The reduction by iron in the chamber 3 involves the separation of zinc, lead, copper, gold and silver, and a proportionate increase in the iron-content of the slag, which may now attain 40–45 per cent. of FeO. This highly ferruginous slag is readily reduced, and the reduction is particularly economical when a portion only of the iron is removed, the FeO content being reduced for instance to 25–35 per cent.; and such partial reduction is sufficient to replenish the iron bath in accordance with the purposes of this invention. The slag flowing from the tap 13, if sufficiently rich for such purpose, may be smelted for iron.

It is to be understood that the foregoing description is merely illustrative of one mode of applying the invention, and that the actual procedure may be widely varied. For instance, the smelting furnace for the ferruginous slag may be entirely separated from the zinc-reduction furnace, and may be of any suitable type, the iron delivered therefrom being introduced into the zinc-smelting furnace either in molten condition or granulated. The zinc-bearing slags from lead or other blast furnaces may be modified as desired by use of acid or basic additions, or by the addition of raw sulfid ores of zinc in proportion equivalent to any excess of iron produced in the process and returned to the zinc-smelting furnace, in which case the zinc sulfid will be reduced by the iron with formation of an iron or iron-copper matte, as above mentioned. In case sulfur is present in the slag or additions, the zinc-smelting furnace serves also as a desulfurizing furnace.

Instead of slag derived from lead blast furnaces or the like, the process may of course be operated with a properly compounded ore-charge from any source. The use of lead blast-furnace slag, however, and the practice of the present process in conjunction with the smelting of lead ores in such furnaces presents very material advantages, particularly in that it permits the capacity of the lead blast furnace to be largely increased. This is due to the fact that the lead blast furnace may be operated at high capacity and without strict regard for the completeness of the reduction or for exact metallurgical conditions, the rich slags thereby formed being readily worked out in accordance with the present process. The slags moreover may be introduced into the electric furnace in fluid state, with the resulting economy of heat.

I claim:—

1. A cyclical process of treating a charge of zinc-bearing material low in sulfur and containing silica, which consists in electrically heating the said charge in presence of molten iron, producing thereby metallic zinc and a ferruginous silicate slag, condensing the evolved zinc vapors, recovering iron from the said ferruginous silicate slag, and utilizing the reduced iron to reduce further quantities of zinc-bearing material.

2. The herein-described process of treating a charge containing lead, zinc, and sulfur, which consists in smelting the same in a blast furnace with formation of a zinc-bearing slag low in sulfur, introducing said slag in fluid condition into an electric furnace and smelting it therein in presence of molten iron to reduce zinc, condensing the evolved vapors, reducing iron from the resulting ferruginous slag, and returning the reduced iron to the zinc-smelting furnace.

3. The herein-described process of treating ores containing lead and zinc, which consists in smelting the same in a blast furnace under less intensive conditions and at a higher rate than normal, smelting the resulting zinciferous slag in an electric furnace in presence of molten iron and settling out other values in said furnace, reducing iron from the resulting ferruginous slags, and utilizing the iron in the electric furnace to reduce sulfids of lead and zinc.

In testimony whereof I affix my signature in presence of two witnesses.

WOOLSEY McA. JOHNSON.

Witnesses:
    HENRY H. PEASE,
    LYNDON S. BEARDSLEE.